(12) United States Patent
Amrani et al.

(10) Patent No.: US 11,416,757 B2
(45) Date of Patent: Aug. 16, 2022

(54) CLASSIFIER TRAINING USING NOISY SAMPLES

(71) Applicant: International Business Machines Corporation, Armonk, NY (US)

(72) Inventors: Elad Amrani, Zikhron Yaakov (IL); Udi Barzelay, Haifa (IL); Rami Ben-Ari, Kiryat Ono (IL); Tal Hakim, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 519 days.

(21) Appl. No.: 16/672,541

(22) Filed: Nov. 4, 2019

(65) Prior Publication Data

US 2021/0133602 A1 May 6, 2021

(51) Int. Cl.
*G06N 5/04* (2006.01)
*G06N 20/00* (2019.01)
*G06F 16/35* (2019.01)
*G06N 99/00* (2019.01)
*G06N 3/08* (2006.01)
*G06N 3/00* (2006.01)

(52) U.S. Cl.
CPC ............ *G06N 5/04* (2013.01); *G06N 20/00* (2019.01); *G06F 16/35* (2019.01); *G06N 3/004* (2013.01); *G06N 3/08* (2013.01); *G06N 99/00* (2013.01)

(58) Field of Classification Search
CPC ............ G06N 5/04; G06N 20/00; G06N 3/08; G06N 99/00; G06N 3/004; G06F 16/35; G06F 40/216
See application file for complete search history.

(56) References Cited

U.S. PATENT DOCUMENTS

| 9,665,824 | B2 | 5/2017 | Chang et al. |
| 9,965,704 | B2 | 5/2018 | Zhou et al. |
| 2015/0110387 | A1* | 4/2015 | Lienhart ............. G06F 16/5838 382/159 |
| 2016/0379371 | A1 | 12/2016 | Chen et al. |
| 2018/0322371 | A1 | 11/2018 | Dupont De Dinechin et al. |
| 2019/0258671 | A1 | 8/2019 | Bou et al. |

FOREIGN PATENT DOCUMENTS

WO 2018176035 A1 9/2018

OTHER PUBLICATIONS

List of Patents or Applications Treated as Related for U.S. Appl. No. 16/672,541, filed Nov. 4, 2019, Appendix P.
(Continued)

*Primary Examiner* — Joseph J Lauture
(74) *Attorney, Agent, or Firm* — Barry D. Blount (57) ABSTRACT

An example system includes a processor to receive input data comprising noisy positive data and clean negative data. The processor is to cluster the input data. The processor is to compute a potential score for each cluster of the clustered input data. The processor is to iteratively refine cluster quality of the clusters using the potential scores of the clusters as weights. The processor is to train a classifier by sampling the negative dataset uniformly and the positive set in a non-uniform manner based on the potential score.

23 Claims, 8 Drawing Sheets

(56) References Cited

OTHER PUBLICATIONS

Amrani, Elad et al.,"Toward Self-Supervised Object Detection in Unlabeled Videos," arXiv:1905.11137v1 [cs.CV], May 27, 2019, pp. 10.
Uijlings, J. R. R. et al., "Selective Search for Object Recognition," International Journal of Computer Vision, 2013, pp. 15.
Mozilla DeepSpeech, "A TensorFlow Implementation of Baidu's DeepSpeech Architecture," Printed Oct. 28, 2019. pp. 3 <https://github.com/mozilla/DeepSpeech>.
Jie, Zequn et al., "Deep Self-Taught Learning for Weakly Supervised Object Localization," arXiv: 1704.05188v2 [cs.CV], National University of Singapore, Apr. 30, 2017 pp. 9.

* cited by examiner

CLASSIFIER TRAINING USING NOISY SAMPLES

BACKGROUND

The present techniques relate to training classifiers. More specifically, the techniques relate to training classifiers using noisy samples.

SUMMARY

According to an embodiment described herein, a system can include processor to receive input data including noisy positive data and clean negative data. The processor can also further cluster the input data. The processor can also compute a potential score for each cluster of the clustered input data. The processor can iteratively refine cluster quality of the clusters using the potential scores of the clusters as weights. The processor can also train a classifier by sampling the negative dataset uniformly and the positive set in a non-uniform manner based on the potential score.

According to another embodiment described herein, a computer-implemented method can include receiving, via a processor, input data including noisy positive data and clean negative data. The method can further include clustering, via the processor, the input data. The method can also further include computing, via the processor, a potential score for each cluster of the clustered input data. The method can also include iteratively refining, via the processor, a cluster quality of the clusters using the potential scores of the clusters as weights. The method can also further include training, via the processor, a classifier by sampling the negative dataset uniformly and the positive set in a non-uniform manner based on the potential score.

According to another embodiment described herein, a computer program product for training classifiers can include computer-readable storage medium having program code embodied therewith. The computer readable storage medium is not a transitory signal per se. The program code executable by a processor to cause the processor to receive input data including noisy positive data and clean negative data. The program code can also cause the processor to cluster the input data. The program code can also cause the processor to compute a potential score for each cluster of the clustered input data. The program code can also cause the processor to iteratively refine cluster quality of the clusters using the potential scores of the clusters as weights. The program code can also cause the processor to train a classifier by sampling the negative dataset uniformly and the positive set in a non-uniform manner based on the potential score.

DETAILED DESCRIPTION

Classifiers may be trained using labeled training data. For example, labeled training data may include classification labels of classification elements to be classified by the classifier. However, annotating training data to include classification labels may be resource intensive and time consuming. Although it may be easier to generate a training dataset that is large but noisy, it may be particularly difficult to train classifiers using training dataset that is highly noisy. As used herein, noisy training dataset refers to a dataset that includes many false positives. For example, sometimes automatically generated training data set may have a false positive rate of 50% or more.

According to embodiments of the present disclosure, a system includes a processor to receive input data including noisy positive data and clean negative data. The processor can cluster the input data. The processor can compute a potential score for each cluster of the clustered input data. The processor can iteratively refine cluster quality of the clusters using the potential scores of the clusters as weights. The processor can train a classifier by sampling the negative dataset uniformly and the positive set in a non-uniform manner based on the potential score.

Thus, embodiments of the present disclosure can use noisy positive samples to train a classifier to classify data, without any manual labeling or annotation of training data involved. For example, the noise level of the noisy positive samples may be more than 50% and up to 68% or more in some cases. The techniques for training classifiers described herein are thus robust to high levels of noise. The techniques may decrease the noise levels using sampling of noisy positive samples performed in non-uniform manner In particular, the sampling may be based on a global similarity amongst positive samples as compared to clean negative samples. In various examples, the global similarity of positive samples and discrimination from negative samples may be formalized into a potential score function. The techniques described herein may thus exploit discrimination of positive instances from negative instances, which in some instances may be easier to obtain. It is to be understood that some embodiments may not have these potential advantages and these potential advantages are not necessarily required of all embodiments.

Figure 1:
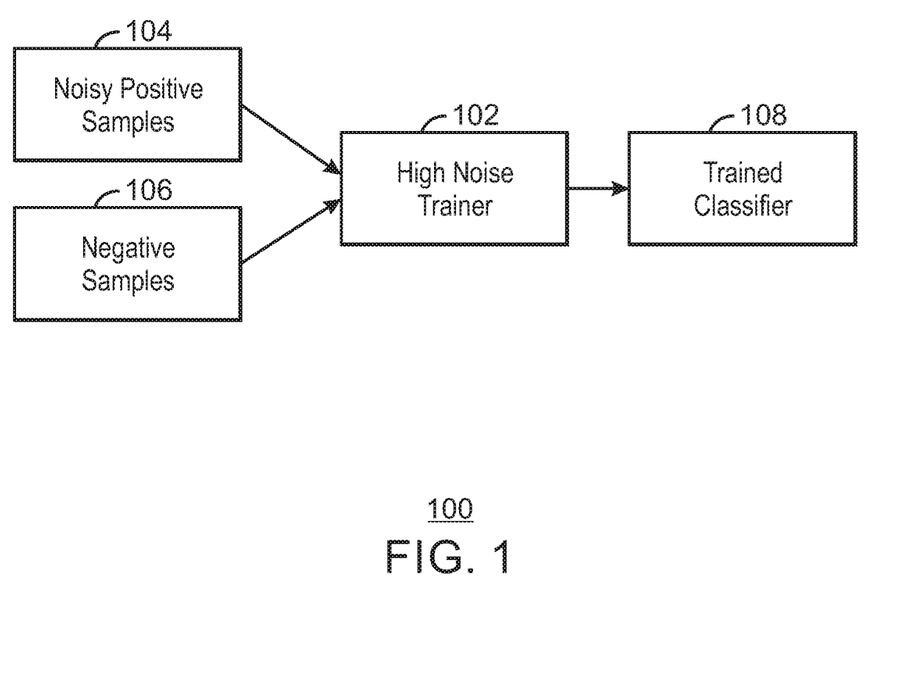
FIG. 1 is a block diagram of an example system for training of a classifier using noisy samples.

With reference now to FIG. 1, a block diagram shows an example system for training of a classifier using noisy samples. The example system 100 can be implemented using the computing device 500 of FIG. 5 using the method 300 of FIG. 3.

FIG. 1 includes a high noise trainer 102. The high noise trainer 102 receives noisy positive samples 104 and negative samples 106. The high noise trainer 102 is communicatively coupled to a trained classifier 108. For example, the trained classifier 108 may be a binary classifier.

In the example of FIG. 1, the high noise trainer 102 can generate a trained classifier 108 by training a classifier using noisy positive samples 104 and negative samples 106. For example, the noisy positive samples 104 may not include a positive sample in more than 50% of its samples.

Still referring to FIG. 1, the high noise trainer 102 may determine common elements in the noisy samples 104 that are less likely to exist in their negative sample 106 counterparts. This commonality may be expressed in a potential score, which is discussed in detail with respect to FIG. 2. For example, the high noise trainer 102 may cluster the data using weighted Deep Embedded Clustering (W-DEC) and then compute the potential score for each cluster generated via the W-DEC. In some examples, the high noise trainer 102 may iteratively refine the cluster quality using weighted k-means. For example, the potential score may be used as a weight to refine the clustering, as described in detail with respect to FIG. 2. The noisy positive samples 104 and the negative samples 106 may then be sampled based on the potential score to train the classifier 108. In various examples, based on the potential score, noisy positive samples 104 may be sampled in a non-uniform way to train the detector. In this way, high noise trainer 102 may use cluster ranking to sample clean data in a non-uniform manner In some examples, given their lower noise level, the negative samples 106 may be sampled uniformly. The high noise trainer 102 is discussed in greater detail with respect to the system 200 of FIG. 2, which may be used to implement the techniques described herein.

It is to be understood that the block diagram of FIG. 1 is not intended to indicate that the system 100 is to include all of the components shown in FIG. 1. Rather, the system 100 can include fewer or additional components not illustrated in FIG. 1 (e.g., additional trainers, or additional classifiers, input data, etc.).

Figure 2:
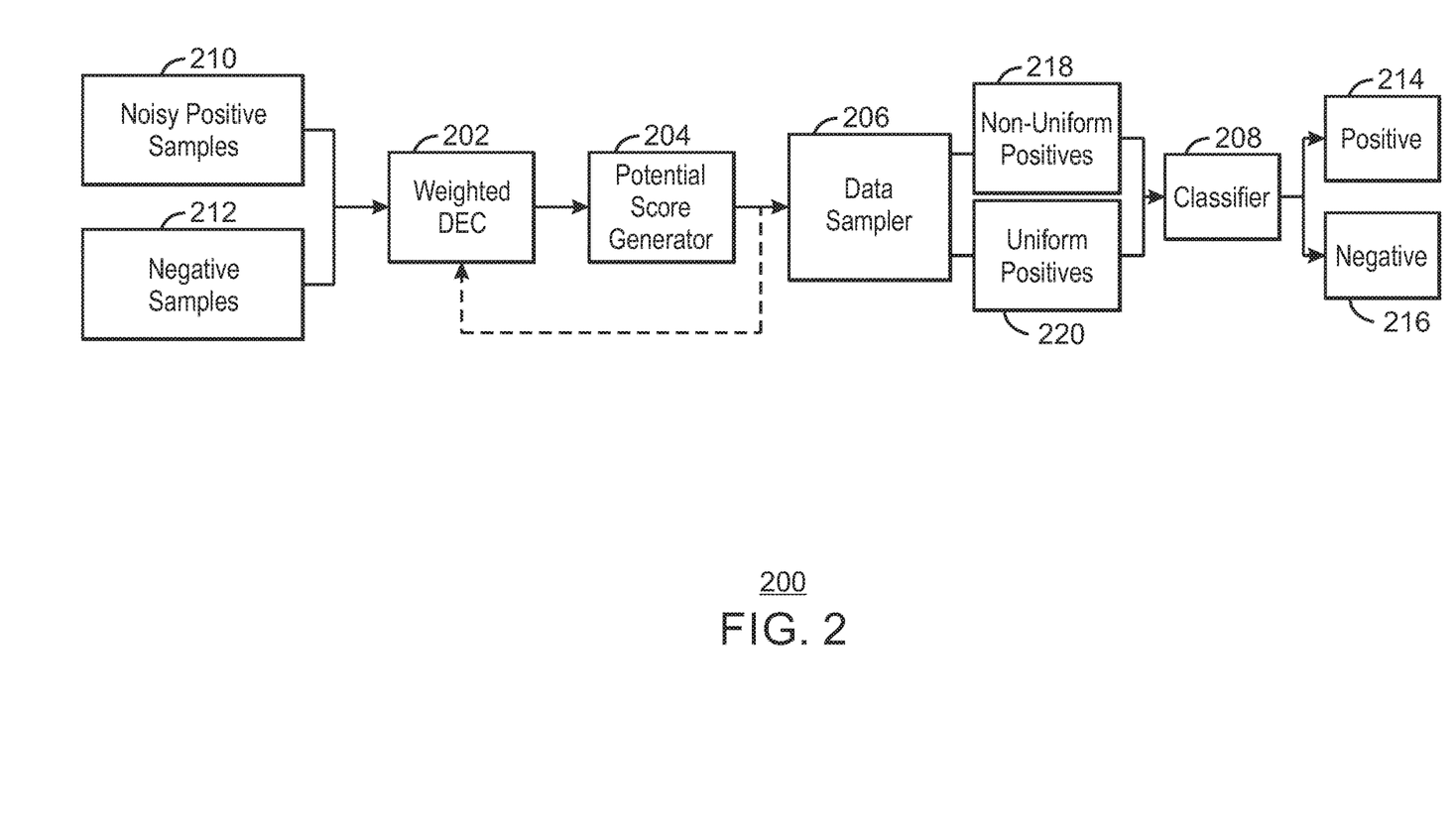
FIG. 2 is a block diagram of another example system for training of a classifier using noisy samples.

With reference now to FIG. 2, a block diagram shows another example system for training of a classifier using noisy samples. The example system 200 can be implemented using the computing device 500 of FIG. 5 using the method 300 of FIG. 3.

The system 200 of FIG. 2 includes a weighted deep embedded clustering (DEC) component 202 communicatively coupled to a potential score generator 204. The system 200 further includes a data sampler 206 communicatively coupled to the potential score generator 204. The system 200 further also includes a classifier 208 communicatively coupled to the data sampler 206. For example, the classifier 208 may be a binary classifier.

In the example of FIG. 2, the system 200 may receive noisy positive samples 210 and negative samples 212 and train the classifier 208 to classify data as positive 214 or negative 216. For example, the classifier 208 may be trained to classify images, audio, or any other classifiable form of data.

Still referring to FIG. 2, the input noisy positive samples 210 may be a large set of images, at least some of which contain subject matter of the classification. In some examples, the input noisy samples 210 may be audio samples, at least some of which may contain sounds corresponding to the classification. In various examples, the noise level of the noisy positive samples 210 may be more than 50%. For example, only half or less of the noisy positive samples 210 may actually include actual positive samples. The negative samples 212 may be clean negative samples. For example, the noise level of the negative samples 212 may be less than 5%.

In various examples, the weighted DEC 202 clusters the samples including the noisy positive samples 210 and the negative samples 212. For example, the DEC 202 may cluster the samples using a weighted variation of deep embedded clustering (DEC). In some examples, the DEC 202 may cluster the samples using K-means. For example, the DEC 202 may initialize K cluster centroids using uniform K-means. In various examples, the weighted DEC 202 may be any other suitable clustering technique.

Following the DEC, in some examples, the potential score generator 204 can generate a potential score for each cluster. For example, the potential score may approximate the cluster quality of each cluster. For example, a similarity measure may be calculated using the Equation:

$$q_{i,j} = \frac{(1+\|z_i - \mu_j\|^2)^{-1} \cdot w(i, j)}{\sum_{j'}(1+\|z_i - \mu_{j'}\|^2)^{-1} w(i, j')} \quad \text{Eq. 1}$$

with indices i and j associated with the sample and cluster respectively, $z_i$ corresponds to region embedding and $\mu_j$ is the cluster centroid. Here and in the following examples, the frame index l is omitted for simplicity. In some examples, the newly added w(i,j) act as selective weights. In various examples, the weights may be set according to the region label $y_i \in \{0,1\}$ as:

$$w(i, j) = \begin{cases} 0.5, & \text{if } yi = 0 \\ 1, & \text{otherwise} \end{cases} \quad \text{Eq. 2}$$

and use the new measure in Eq. 1 to drive the clustering to the target distribution:

$$p_{i,j} = \frac{q_{ij}^2 / f_j}{\sum_{j'} q_{ij'}^2 / f_{j'}} \quad \text{Eq. 3}$$

with:

$$f_j = \Sigma_i q_{ij} \quad \text{Eq. 4}$$

using a Kullback-Leibler divergence loss. This weighted DEC 208 focuses the clustering toward positive regions. In various examples, the weighting may be applied for clusters with positive ratio above a threshold. In some examples, the DEC is re-initialized by weighted K-means every I epochs, with the new weights set by $S_k$ normalized by the number of positive samples in the cluster. In various examples, the clusters and the potential score are iteratively refined. In some examples, only cluster centroids are optimized, while embeddings remain fixed. The embeddings are vector representations of the data. For example, each single region proposal may be represented as a vector.

The weighted DEC 208 may thus be used to determine common themes across positive samples 210 that are less likely to exist in negative sample 212 counterparts. To this end, the weighted DEC 208 clusters the regions in the embedded space as described above. For example, clusters with dense population of positive regions are likely to contain the object of interest. Therefore, a positive ratio score may be associated to each cluster. In various examples, the positive ratio score may be defined as the ratio between the positive and the total number of samples in the cluster. Yet, high positive-ratio clusters are noisy, so that real object clusters are not always distinguishable. Therefore, the weighted DEC 208 may search for a target cluster satisfying the following properties: a high positive ratio and a low cluster variance, for tendency to include a single object type.

These constraints may be represented in a softmax function $S_k$, referred to herein as a potential score. The potential score may be the score of cluster k containing an element to be classified. For example, the potential score $S_k$ can be calculated using the Equation:

$$S_k = \sigma\left(\tau \frac{P_k^2}{V_k}\right) \quad k \in \{0 \ldots K-1\} \qquad \text{Eq. 5}$$

where $\sigma(\cdot)$ is the softmax function, K denoting the total number of clusters, $\tau \in R$ is the softmax temperature, $P_k$ is the positive ratio, and $V_k$ is the cluster distance variance. In various examples, all parameters are normalized to a unit sum. As shown in Eq. 5, the positive-ratio $P_k$ may be squared to indicate its relative importance as compared to the cluster distance variance. The low cluster variance may be used as an indication that a cluster includes a single object type.

In various examples, each cluster is assigned a potential score as defined in Eq. 5. This potential score is based on a positive ratio, a cluster variance, or any combination thereof. In various examples, the potential score may be formulated to correlate with cluster precision with regards to ground truth. For example, cluster precision may be the ratio of regions in a cluster that contains instances of the object. In some examples, the classifier 208 is then trained by being fed by the following samples. For the noisy positive samples 210, the samples with high potential score $S_k$ are used for training. In some examples, the sampling distribution is the normalized score $S_k$. Because the sample scores are associated with their corresponding cluster k, this sampling strategy allows sampling from several clusters. This sampling regime continuously reduces the noise level in the positive set to train a higher accuracy region classifier 2208. For example, the weighted DEC 202 may repeatedly cluster data again using weighted K-Means. In various examples, a positive sample weight is its source cluster score value divided by the number of positive samples in cluster. A negative sample weight is 1 divided by the number of negative samples. The negative sample weight may thus be uniform over negatives.

In various examples, negative samples are sampled uniformly from the negative frames. In some examples, the classifier 208 may be any suitable classifier. As one example, the classifier 208 can be a multilayer perceptron with three fully connected layers trained to separate between a classification element and a background, using cross-entropy loss. In every training cycle, the classifier 208 may be initialized for training with weights from previous iteration.

As one example, the settings for clustering of K=50, and τ=50 may be used in Eq. 5. The positive ratio threshold may be set as $P_k \geq 0.6$. In the classifier 208, three fully connected (FC) layers (1024, 1024, 2) may be used with a ReLU activation in layers 1-2 and a softmax activation for the output layer. A dropout may be used for the two hidden layers with probability of 0.8. In some examples, the classifier 208 can be trained with the cross-entropy loss function. The ADAM optimizer may be used for optimization with a learning rate of $10^{-4}$. The learning rate is decreased by a factor of 0.6 every 6 epochs. In some examples, the model may be trained for 35 epochs for all classification elements. In some examples, the training may performed using a graphics processing unit. For example, the GPU may be a Tesla K80 GPU, or any other suitable GPU.

It is to be understood that the block diagram of FIG. 2 is not intended to indicate that the system 200 is to include all of the components shown in FIG. 2. Rather, the system 200 can include fewer or additional components not illustrated in FIG. 2 (e.g., additional DECs, or additional samplers, samples, classifications, etc.). For example, any other suitable clustering technique may be used in place of the DEC.

Figure 3:
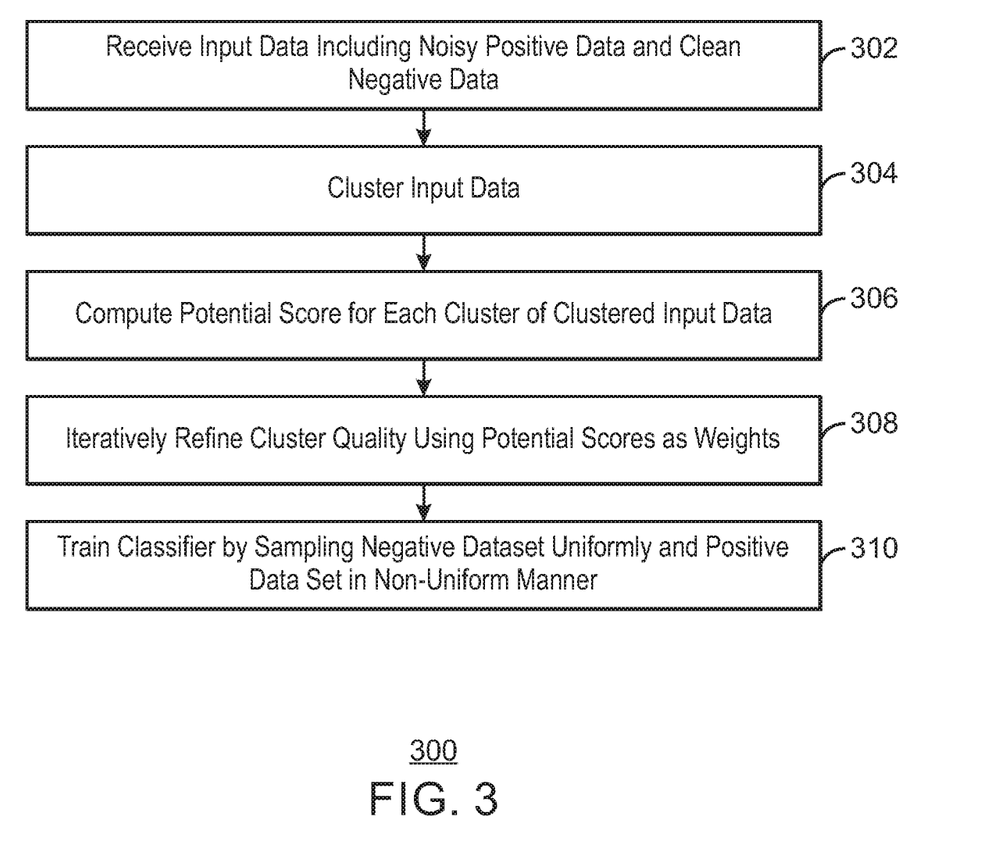
FIG. 3 is a block diagram of an example method that can train a classifier using noisy samples.

FIG. 3 is a process flow diagram of an example method that can train a classifier detector using noisy samples. The method 300 can be implemented with any suitable computing device, such as the computing device 500 of FIG. 5 and is described with reference to the systems 100 and 200 of FIGS. 1 and 2. For example, the method 300 can be implemented by the processor 502 or the processor 802 of FIGS. 5 and 8.

At block 302, input data including noisy positive data and clean negative data is received. For example, the noisy positive data may have a noise level of more than 50%. In some examples, the clean negative samples may have a negligible noise level. In various examples, the input data may be images, audio, or any other form of training data.

At block 304, the input data is clustered. In various examples, the input data is clustered by performing a weighted deep embedded clustering.

At block 306, a potential score is computed for each cluster of the clustered input data. The potential score for each cluster may be based on a positive ratio, cluster variance, or both. For example, clusters with a higher positive ratio may have a higher potential score. Similarly, clusters having a lower cluster variance may have a higher potential score. As one example, the potential score may be calculated using Eq. 5.

At block 308, a cluster quality of the clusters is iteratively refined using the potential scores of the clusters as weights. For example, the clusters may be refined using a weighted k-means.

At block 316, a classifier is trained by sampling the negative dataset uniformly and the positive set in a non-uniform manner based on the potential score. For example, noisy positive samples may be sampled using the potential score as a distribution. In various examples, the selected positive samples may be from clusters with higher potential scores.

The process flow diagram of FIG. 3 is not intended to indicate that the operations of the method 300 are to be executed in any particular order, or that all of the operations of the method 300 are to be included in every case. Additionally, the method 300 can include any suitable number of additional operations.

Figure 4:
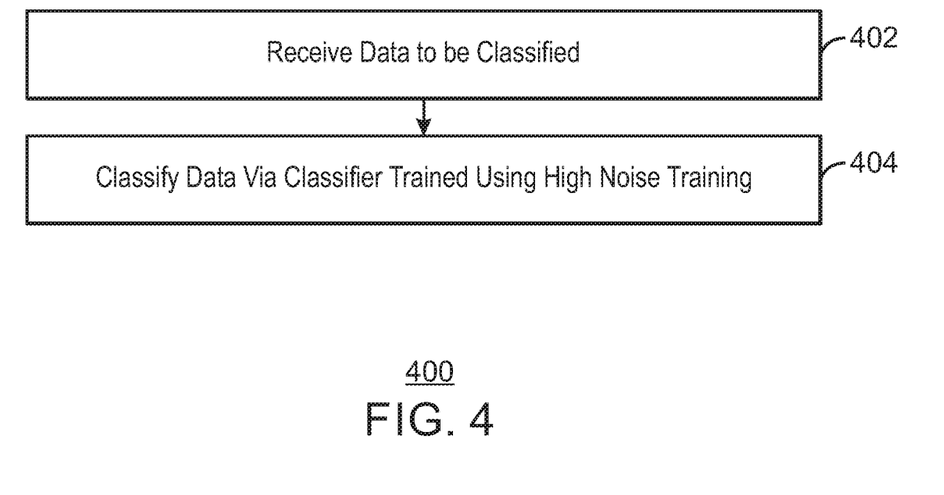
FIG. 4 is a block diagram of an example method that can classify input data using a classifier trained using noisy samples.

FIG. 4 is a process flow diagram of an example method that can classify input data using a classifier trained using noisy samples. The method 400 can be implemented with any suitable computing device, such as the computing device 500 of FIG. 5 and is described with reference to the systems 100 and 200 of FIGS. 1 and 2. For example, the method 400 can be implemented by the processor 502 or the processor 802 of FIGS. 5 and 8.

At block 402, data is received. For example, the data may be an image, such as a frame from a video or a still image. In some examples, the data may be an audio sample. In various examples, the data may be any other form of classifiable data.

At block 404, the data is classified via a classifier trained via high noise training. In various examples, the classifier may be trained to classify the data based on noisy positive data. For example, the classifier may trained using the method 300 of FIG. 3. As one example, an input audio may be classified as including or not including speech. As another example, an input image may be classified as including or not including an object.

The process flow diagram of FIG. 4 is not intended to indicate that the operations of the method 400 are to be executed in any particular order, or that all of the operations of the method 400 are to be included in every case. Additionally, the method 400 can include any suitable number of additional operations. For example, the method 400 may include performing image classification, object detection, source speaker classification, using the classified data, among other applications of the classified data. In some examples, the classified data may then be displayed. As one example, if the data is an image, then the image may be classified as including an object or not including an object.

In some scenarios, the techniques described herein may be implemented in a cloud computing environment. As discussed in more detail below in reference to at least FIGS. 5-8, a computing device configured to train an object detector using unlabeled videos may be implemented in a cloud computing environment. It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
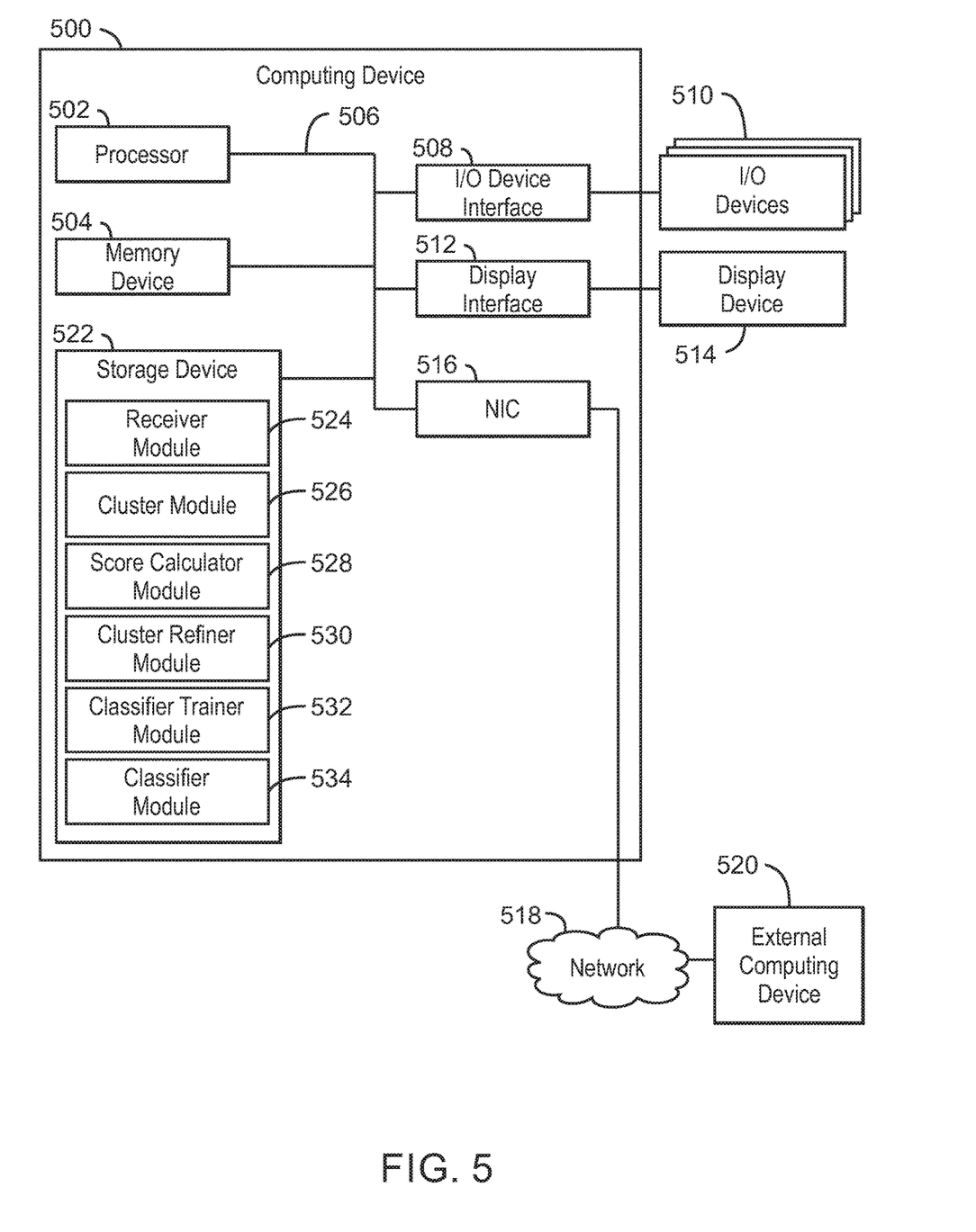
FIG. 5 is a block diagram of an example computing device that can perform training of a classifier using noisy samples.

FIG. 5 is block diagram of an example computing device that can perform training of a classifier using noisy samples. The computing device 500 may be for example, a server, desktop computer, laptop computer, tablet computer, or smartphone. In some examples, computing device 500 may be a cloud computing node. Computing device 500 may be described in the general context of computer system executable instructions, such as program modules, being executed by a computer system. Generally, program modules may include routines, programs, objects, components, logic, data structures, and so on that perform particular tasks or implement particular abstract data types. Computing device 500 may be practiced in distributed cloud computing environments where tasks are performed by remote processing devices that are linked through a communications network.

In a distributed cloud computing environment, program modules may be located in both local and remote computer system storage media including memory storage devices.

The computing device 500 may include a processor 502 that is to execute stored instructions, a memory device 504 to provide temporary memory space for operations of said instructions during operation. The processor can be a single-core processor, multi-core processor, computing cluster, or any number of other configurations. The memory 504 can include random access memory (RAM), read only memory, flash memory, or any other suitable memory systems.

The processor 502 may be connected through a system interconnect 506 (e.g., PCI®, PCI-Express®, etc.) to an input/output (I/O) device interface 508 adapted to connect the computing device 500 to one or more I/O devices 510. The I/O devices 510 may include, for example, a keyboard and a pointing device, wherein the pointing device may include a touchpad or a touchscreen, among others. The I/O devices 510 may be built-in components of the computing device 500, or may be devices that are externally connected to the computing device 500.

The processor 502 may also be linked through the system interconnect 506 to a display interface 512 adapted to connect the computing device 500 to a display device 514. The display device 514 may include a display screen that is a built-in component of the computing device 500. The display device 514 may also include a computer monitor, television, or projector, among others, that is externally connected to the computing device 500. In addition, a network interface controller (NIC) 516 may be adapted to connect the computing device 500 through the system interconnect 506 to the network 518. In some embodiments, the NIC 516 can transmit data using any suitable interface or protocol, such as the internet small computer system interface, among others. The network 518 may be a cellular network, a radio network, a wide area network (WAN), a local area network (LAN), or the Internet, among others. An external computing device 520 may connect to the computing device 500 through the network 518. In some examples, external computing device 520 may be an external webserver 520. In some examples, external computing device 520 may be a cloud computing node.

The processor 502 may also be linked through the system interconnect 506 to a storage device 522 that can include a hard drive, an optical drive, a USB flash drive, an array of drives, or any combinations thereof. In some examples, the storage device may include a receiver module 524, a clustering module 526, a score calculator module 528, a cluster refiner module 530, a classifier trainer module 532, and a classifier module 534. The receiver module 524 can receive input data including noisy positive data and clean negative data. For example, the noisy positive data may be highly noisy data with a noise of more than 50%. The clean negative data may have a low noise. For example, the noise of the clean negative data may be 5% or less. The clustering module 526 can cluster the input data. In some examples, clustering module 526 can cluster the input data using weighted deep embedded clustering. The score calculator module 528 can compute a potential score for each cluster of the clustered data. For example, the score calculator module 528 can compute the potential score based on a positive ratio, a cluster distance variance, or both. The cluster refiner module 530 can iteratively refine cluster quality of the clusters using the potential scores of the clusters as weights. In some examples, the cluster refiner module 530 can iteratively refine the clusters using a weighted k-means. The classifier trainer module 532 can train a classifier by sampling the negative dataset uniformly and the positive set in a non-uniform manner based on the potential score. For example, the classifier trainer module 532 can train a classifier using the potential score as a distribution.

The classifier module 534 can receive data to be classified and classify the data. For example, the classifier module 534 may be trained to classify data via high noise training on noisy samples. In various examples, the classifier module 524 can classify the data with a positive label or a negative label.

It is to be understood that the block diagram of FIG. 5 is not intended to indicate that the computing device 500 is to include all of the components shown in FIG. 5. Rather, the computing device 500 can include fewer or additional components not illustrated in FIG. 5 (e.g., additional memory components, embedded controllers, modules, additional network interfaces, etc.). For example, the computing device 500 may include a displayer to display the classified data. Furthermore, any of the functionalities of the receiver 524, the clustering module 526, the score calculator module 528, the cluster refiner module 530, the classifier trainer module 532, the classifier module 534, may be partially, or entirely, implemented in hardware and/or in the processor 502. For example, the functionality may be implemented with an application specific integrated circuit, logic implemented in an embedded controller, or in logic implemented in the processor 502, among others. In some embodiments, the functionalities of the receiver 524, the clustering module 526, the score calculator module 528, the cluster refiner module 530, the classifier trainer module 532, and the classifier module 534534, can be implemented with logic, wherein the logic, as referred to herein, can include any suitable hardware (e.g., a processor, among others), software (e.g., an application, among others), firmware, or any suitable combination of hardware, software, and firmware.

Figure 6:
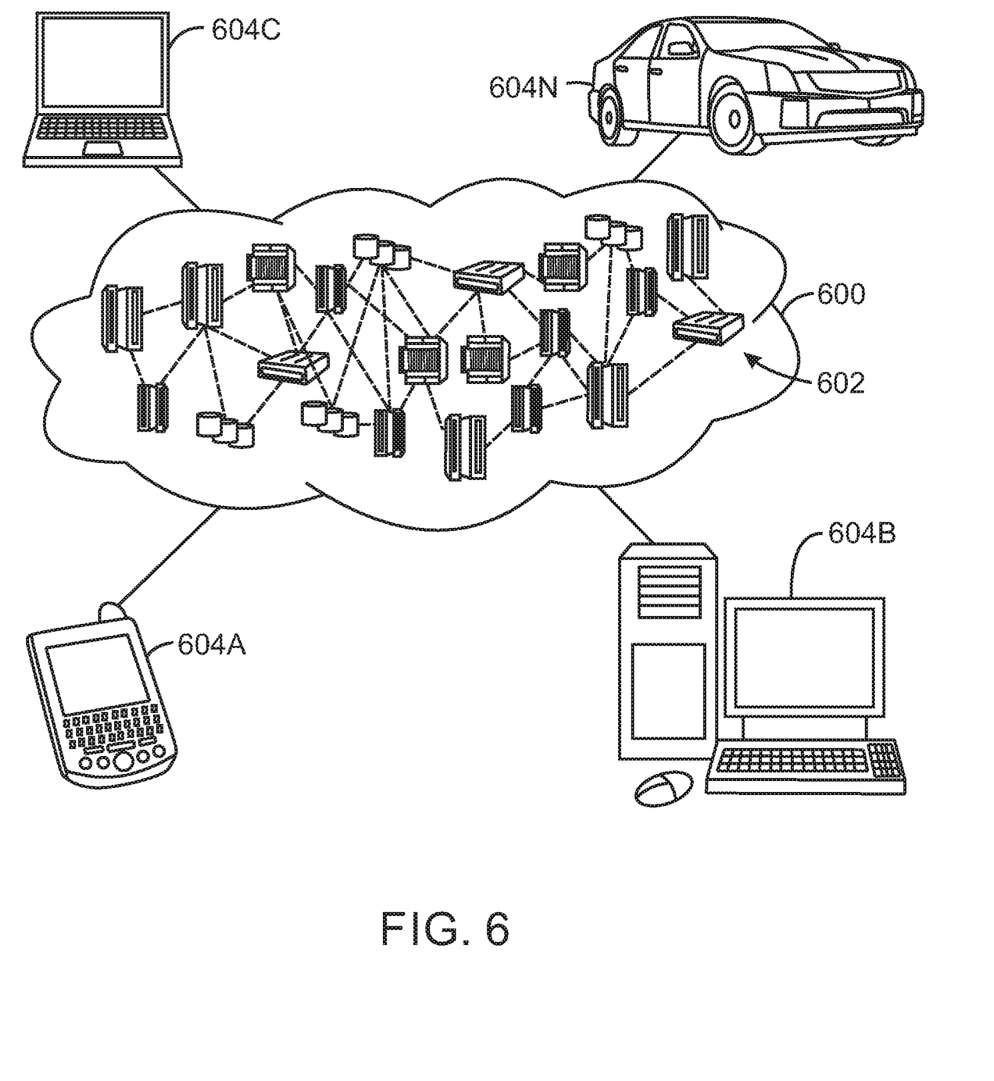
FIG. 6 is a diagram of an example cloud computing environment according to embodiments described herein.

Referring now to FIG. 6, illustrative cloud computing environment 600 is depicted. As shown, cloud computing environment 600 comprises one or more cloud computing nodes 602 with which local computing devices used by cloud consumers, such as, for example, personal digital assistant (PDA) or cellular telephone 604A, desktop computer 604B, laptop computer 604C, and/or automobile computer system 604N may communicate. Nodes 602 may communicate with one another. They may be grouped (not shown) physically or virtually, in one or more networks, such as Private, Community, Public, or Hybrid clouds as described hereinabove, or a combination thereof. This allows cloud computing environment 600 to offer infrastructure, platforms and/or software as services for which a cloud consumer does not need to maintain resources on a local computing device. It is understood that the types of computing devices 604A-N shown in FIG. 6 are intended to be illustrative only and that computing nodes 602 and cloud computing environment 600 can communicate with any type of computerized device over any type of network and/or network addressable connection (e.g., using a web browser).

Figure 7:
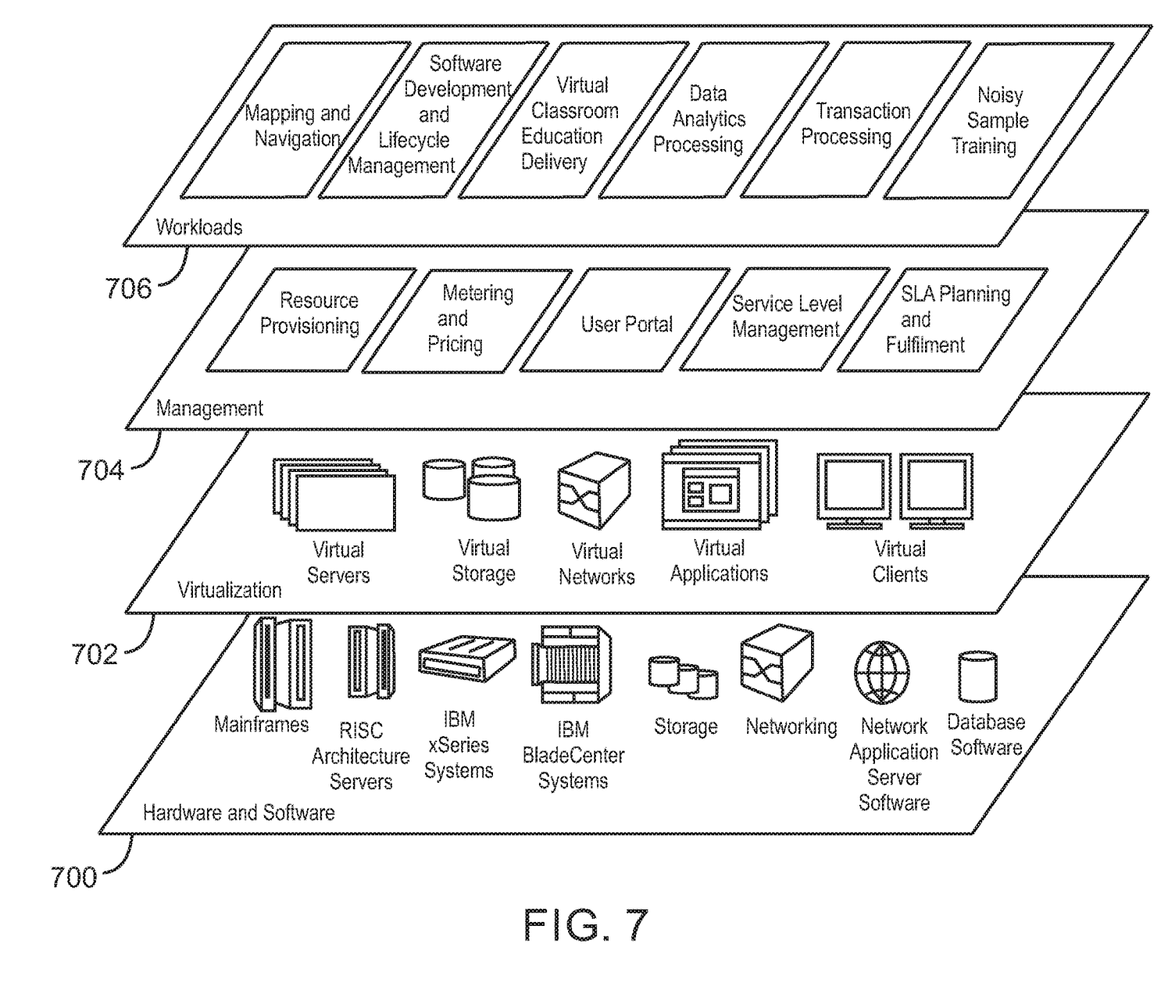
FIG. 7 is a diagram of an example abstraction model layers according to embodiments described herein.

Referring now to FIG. 7, a set of functional abstraction layers provided by cloud computing environment 600 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 700 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 702 provides an abstraction layer from which the following examples of virtual entities may be provided: virtual servers; virtual storage; virtual networks, including virtual private networks; virtual applications and operating systems; and virtual clients. In one example, management layer 704 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 706 provides examples of functionality for which the cloud computing environment may be utilized. Examples of workloads and functions which may be provided from this layer include: mapping and navigation; software development and lifecycle management; virtual classroom education delivery; data analytics processing; transaction processing; and noisy sample training.

The present invention may be a system, a method and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the techniques. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 8:
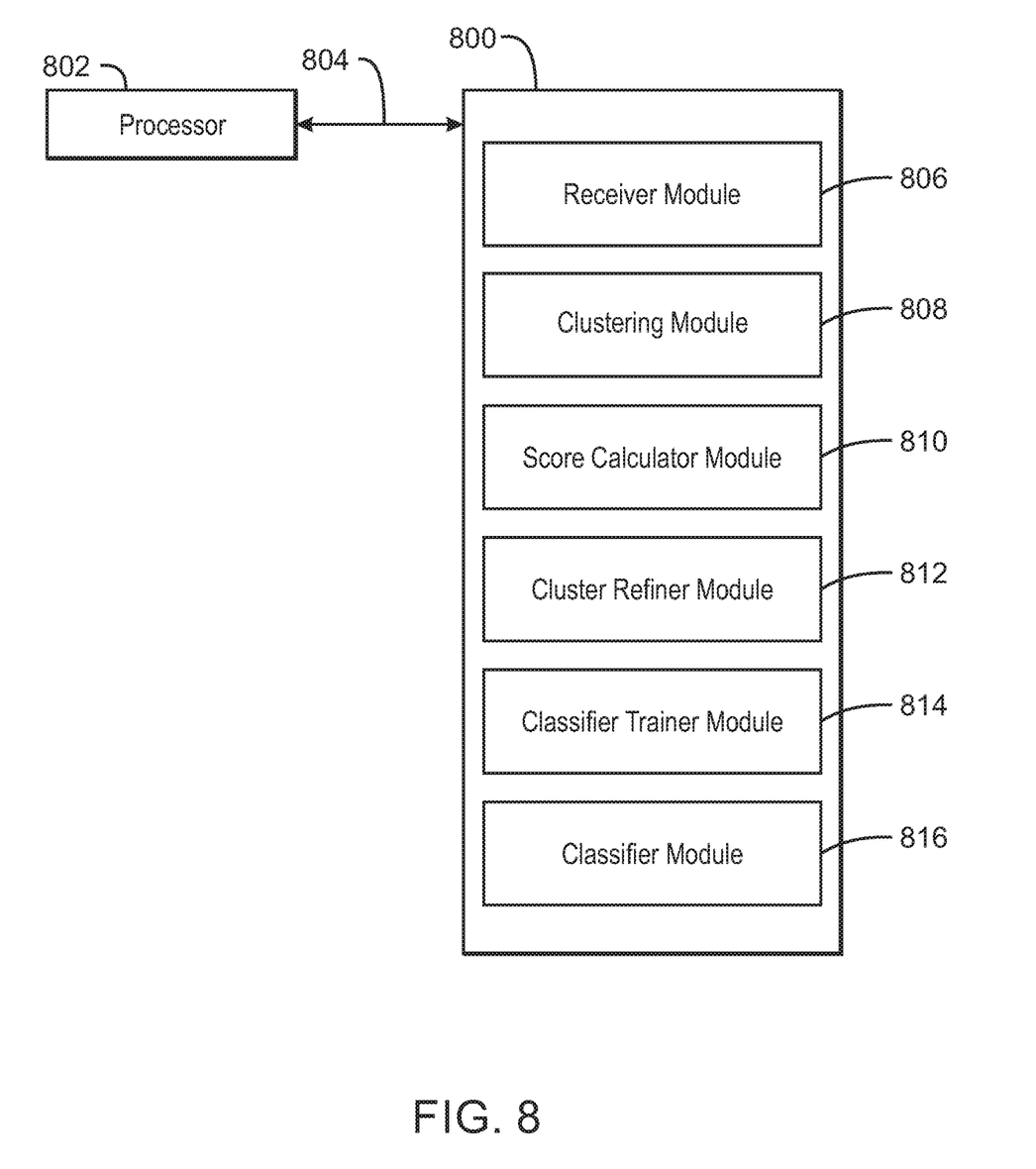
FIG. 8 is an example tangible, non-transitory computer-readable medium that can perform training of a classifier using noisy samples.

Referring now to FIG. 8, a block diagram is depicted of an example tangible, non-transitory computer-readable medium 800 that can perform training of a classifier using noisy samples. The tangible, non-transitory, computer-readable medium 800 may be accessed by a processor 802 over a computer interconnect 804. Furthermore, the tangible, non-transitory, computer-readable medium 800 may include code to direct the processor 802 to perform the operations of the methods 300 and 400 of FIGS. 3 and 4.

The various software components discussed herein may be stored on the tangible, non-transitory, computer-readable medium 800, as indicated in FIG. 8. For example, a receiver module 806 includes code to receive input data including noisy positive data and clean negative data. For example, the noisy positive data may be highly noisy data with a noise of more than 50%. The clean negative data may have a low noise. For example, the noise of the clean negative data may be negligible. A clustering module 808 includes code to cluster the input data. The clustering module 808 further includes code to cluster the input data using weighted deep embedded clustering. A score calculator module 810 includes code to compute a potential score for each cluster of the clustered data. For example, the module 810 may include code to compute the potential score based on a positive ratio, a cluster distance variance, or both. A cluster refiner module 812 includes code to iteratively refine cluster quality of the clusters using the potential scores of the clusters as weights. In some examples, the cluster refiner module 812 includes code to iteratively refine the clusters using a weighted k-means. A classifier trainer module 814 includes code to train a classifier to classify received data. For example, the received data may be an image, audio, or any other data to be classified. In various examples, the classifier trainer module 814 includes code to train a classifier using noisy positive data and clean negative data. For example, the classifier trainer module 814 may include code to train a classifier by sampling the negative dataset uniformly and the positive set in a non-uniform manner based on the potential score. For example, the classifier trainer module 814 includes code to train a classifier using the potential score as a distribution. A classifier module 816 includes code to receive data to be classified and classify the data via a classifier trained via high noise training. For example, the classifier module 816 may include code to classify the data with a positive label or a negative label. In some examples, the classifier module 816 may be trained via the classifier trainer module 814 using high noise training. It is to be understood that any number of additional software components not shown in FIG. 8 may be included within the tangible, non-transitory, computer-readable medium 800, depending on the particular application.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. It is to be understood that any number of additional software components not shown in FIG. 8 may be included within the tangible, non-transitory, computer-readable medium 800, depending on the specific application.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising a processor to:
receive input data comprising noisy positive data and clean negative data;
cluster the input data;
compute a potential score for each cluster of the clustered input data;
iteratively refine cluster quality of the clusters using the potential scores of the clusters as weights; and
train a classifier by sampling the negative dataset uniformly and the positive set in a non-uniform manner based on the potential score.

2. The system of claim 1, wherein the potential score is based on a positive ratio and a cluster distance variance.

3. The system of claim 1, wherein the noisy positive data comprises a noise level of more than 50%.

4. The system of claim 1, wherein the processor is to iteratively refine the clusters using a weighted k-means.

5. The system of claim 1, wherein the processor is to train the classifier using the potential score as a distribution.

6. A computer-implemented method, comprising:
receiving, via a processor, input data comprising noisy positive data and clean negative data;
clustering, via the processor, the input data;
computing, via the processor, a potential score for each cluster of the clustered input data;
iteratively refining, via the processor, a cluster quality of the clusters using the potential scores of the clusters as weights; and training, via the processor, a classifier by sampling the negative dataset uniformly and the positive set in a non-uniform manner based on the potential score.

7. The computer-implemented method of claim 6, comprising computing the potential score based on a positive ratio and a cluster distance variance.

8. The computer-implemented method of claim 6, wherein clustering the input data comprises performing a weighted deep embedded clustering.

9. The computer-implemented method of claim 6, wherein iteratively refining the clusters comprises refining the clusters using a weighted k-means.

10. The computer-implemented method of claim 6, wherein training the classifier comprises using the potential score as a distribution.

11. A computer-implemented method, comprising:
receiving, via a processor, data to be classified;
classifying, via a classifier trained via high noise training, using noisy positive data and clean negative data the data.

12. The computer-implemented method of claim 11, wherein classifying the data comprises classifying the data with a positive label or a negative label.

13. The computer-implemented method of claim 11, comprising training, via the processor, the classifier using iteratively refined clusters of noisy positive samples.

14. The computer-implemented method of claim 11, comprising displaying the classified data.

15. A computer program product for training classifiers, the computer program product comprising a computer-readable storage medium having program code embodied therewith, wherein the computer readable storage medium is not a transitory signal per se, the program code executable by a processor to cause the processor to:
receive input data comprising noisy positive data and clean negative data;
cluster the input data;
compute a potential score for each cluster of the clustered input data;
iteratively refine cluster quality of the clusters using the potential scores of the clusters as weights; and
train a classifier by sampling the negative dataset uniformly and the positive set in a non-uniform manner based on the potential score.

16. The computer program product of claim 15, further comprising program code executable by the processor to compute the potential score based on a positive ratio.

17. The computer program product of claim 15, further comprising program code executable by the processor to compute the potential score based on a cluster distance variance.

18. The computer program product of claim 15, further comprising program code executable by the processor to compute the potential score based on a positive ratio and a cluster distance variance.

19. The computer program product of claim 15, further comprising program code executable by the processor to iteratively refine the clusters using a weighted k-means.

20. A computer program product for classifying data, the computer program product comprising a computer-readable storage medium having program code embodied therewith, wherein the computer readable storage medium is not a transitory signal per se, the program code executable by a processor to cause the processor to:
receive data to be classified; and
classify the data via a classifier trained via high noise training using noisy positive data and clean negative data.

21. The computer program product of claim 20, further comprising program code executable by the processor to classify the data with a positive label or a negative label.

22. The computer program product of claim 20, further comprising program code executable by the processor to train the classifier using iteratively refined clusters of noisy positive samples.

23. The computer program product of claim 20, further comprising program code executable by the processor to display the classified data.

* * * * *